Dec. 9, 1969  W. A. NOBLE  3,482,911
IMAGE PROJECTION APPARATUS
Filed March 20, 1967  3 Sheets-Sheet 2
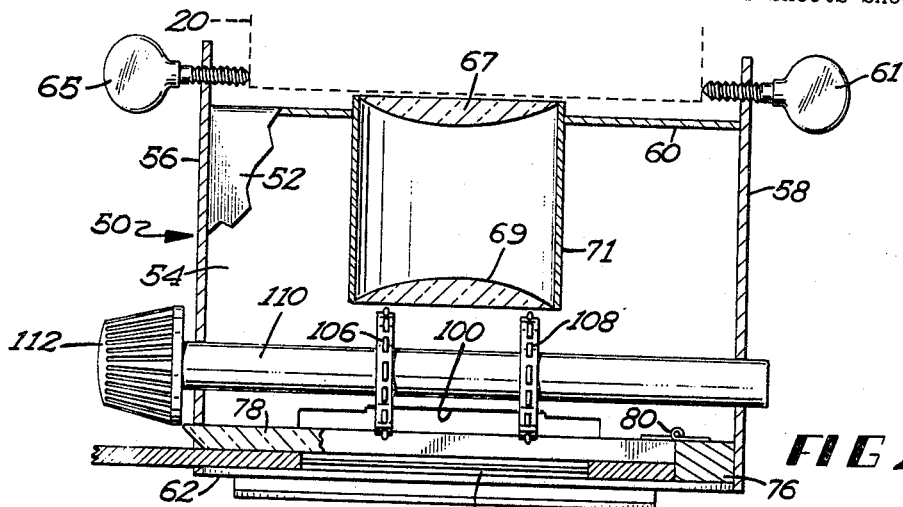
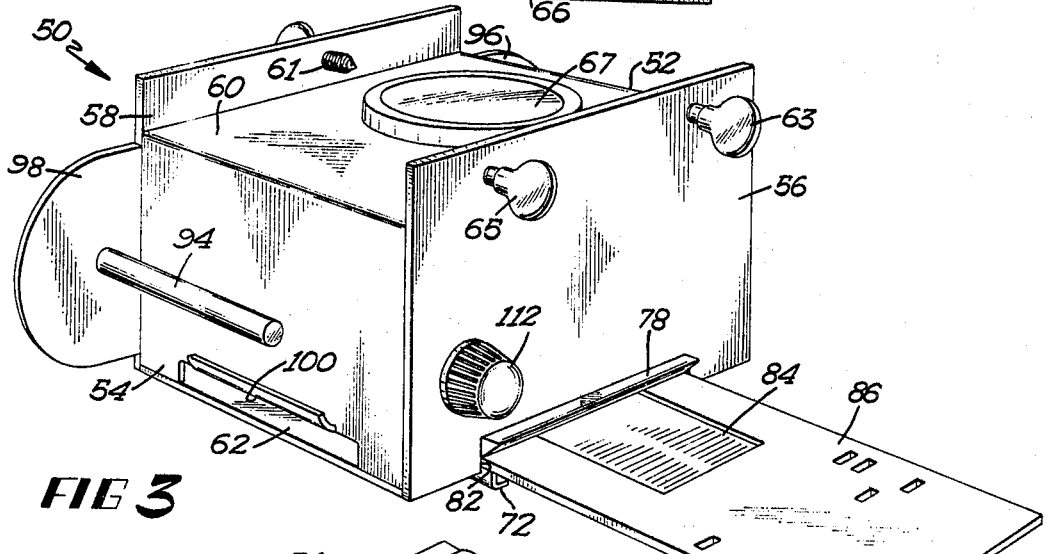
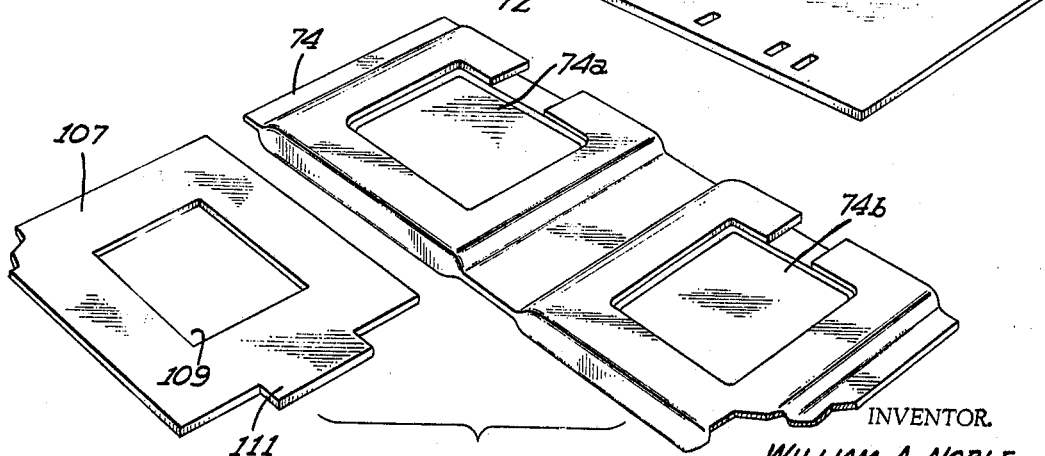
INVENTOR.
WILLIAM A. NOBLE
BY
James V. Harmon
ATTORNEY

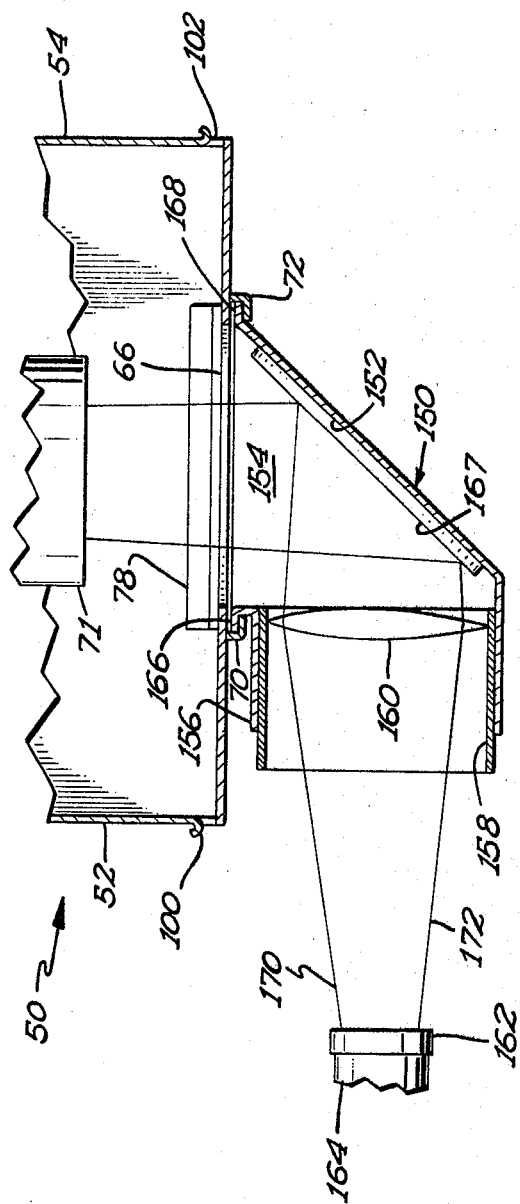

United States Patent Office 3,482,911
Patented Dec. 9, 1969

3,482,911
IMAGE PROJECTION APPARATUS
William A. Noble, 2191 Como Ave.,
St. Paul, Minn. 55108
Filed Mar. 20, 1967, Ser. No. 624,367
Int. Cl. G03b 21/28, 21/00
U.S. Cl. 353—98                                    10 Claims

ABSTRACT OF THE DISCLOSURE

Apparatus for use in conjunction with a overhead projector for displaying images of photographs, film transparencies, microfilm, motion picture film, transparent photographic slides and the like. The apparatus consists of a lens and stage supporting housing removably mounted upon the projector typically adjacent to the projection lense of the projector. The housing includes an object stage in optical alignment with the projection lens and a supplementary lens assembly to provide an enlarged virtual image of the object mounted on the stage. The virtual image is located at the approximate location of a platform used to support objects that are projected when the apparatus is not in use.

---

The present invention relates to optical equipment and more particularly to an apparatus for projecting and displaying images of objects such as photographic film transparencies including microfilm, motion picture film, transparent photographic slides and opaque materials. The invention can be utilized in original equipment but is particularly advantageous as an accessory for use in conjunction with existing projection equipment.

The invention is especially useful in connection with commercially available overhead projectors.

Overhead projectors of the type described in Patent No. 3,126,786 employ a Freznel lens as a condenser. The condenser is spaced about eight inches from the projection lamp. A relatively large transparent object or original copy is placed in contact with the Freznel lens during operation. A glass projection lens is spaced from about ten to twelve inches from the Freznel lens and in optical alignment with it. A mirror is positioned adjacent to the projection lens for directing the image horizontally onto a wall or screen. Owing to the large size of the Freznel lens, the overhead projector will easily accommodate relatively large objects such as 8½ x 11 inch transparent sheets. Commercially available overhead projectors also have the ability to project a relatively large image onto a screen positioned only a few feet from the projector. Overhead projectors, on the other hand, are unsuited for projecting a variety of objects such as 35 mm. and 120 mm. transparent microfilm records and film strips. Accordingly, when visual material of this type is to be used, the overhead projector must be set aside and an entirely different type of projector employed.

Heretofore, the various transparencies discussed above each required a different type of projection unit. This is particularly objectionable in the case of visual aids that are to be projected in a classroom since interruptions caused by the instructor moving from place to place in the room tend to distract the students.

In view of the deficiencies of the prior art, it is one object of the present invention to provide a device which can be used in conjunction with a commercially available overhead projector for projecting transparent photographic slides, transparent microphotographs or microfilm supporting cards sometimes known as aperture cards, motion picture films and other objects.

Another object of the present invention is the provision of an apparatus for projecting transparent photographic slides, microphotographs, film strips, motion picture film and other objects from a projection point located about six to twelve feet from the projection screen.

A further object of the present invention is the provision of an improved projection apparatus wherein a single auxiliary apparatus is suited for projecting a variety of visual objects.

A further object of the invention is the provision of an improved projection apparatus for projecting a variety of visual media of the type described wherein a conversion from one form of visual medium to another can be easily and quickly accomplished.

A further object of the invention is the provision of an improved projection apparatus of the type described that is suited for projecting relatively small transparent objects such as the photomicrographic transparencies provided within aperture cards wherein a large fraction of the available illumination passes through the object and is projected onto the image screen.

These and other more detailed and specific objects and advantages of the invention will become apparent in view of the accompanying description setting forth a specific form of the invention and by the accompanying drawings wherein:

FIGURE 2 is a vertical sectional view taken on line 2—2 of FIGURE 1.

FIGURE 3 is a perspective view of the adapter housing in accordance with the invention as seen from the side opposite that shown in FIGURE 1.

FIGURE 4 is a perspective view of a mask and slide holder of the type used in the projection of film strips and transparent, photographic slides respectively.

FIGURE 5 is a semi-diagrammatic vertical sectional view of a modified form of the invention used in projecting the image of a motion picture film.

Figure 1:
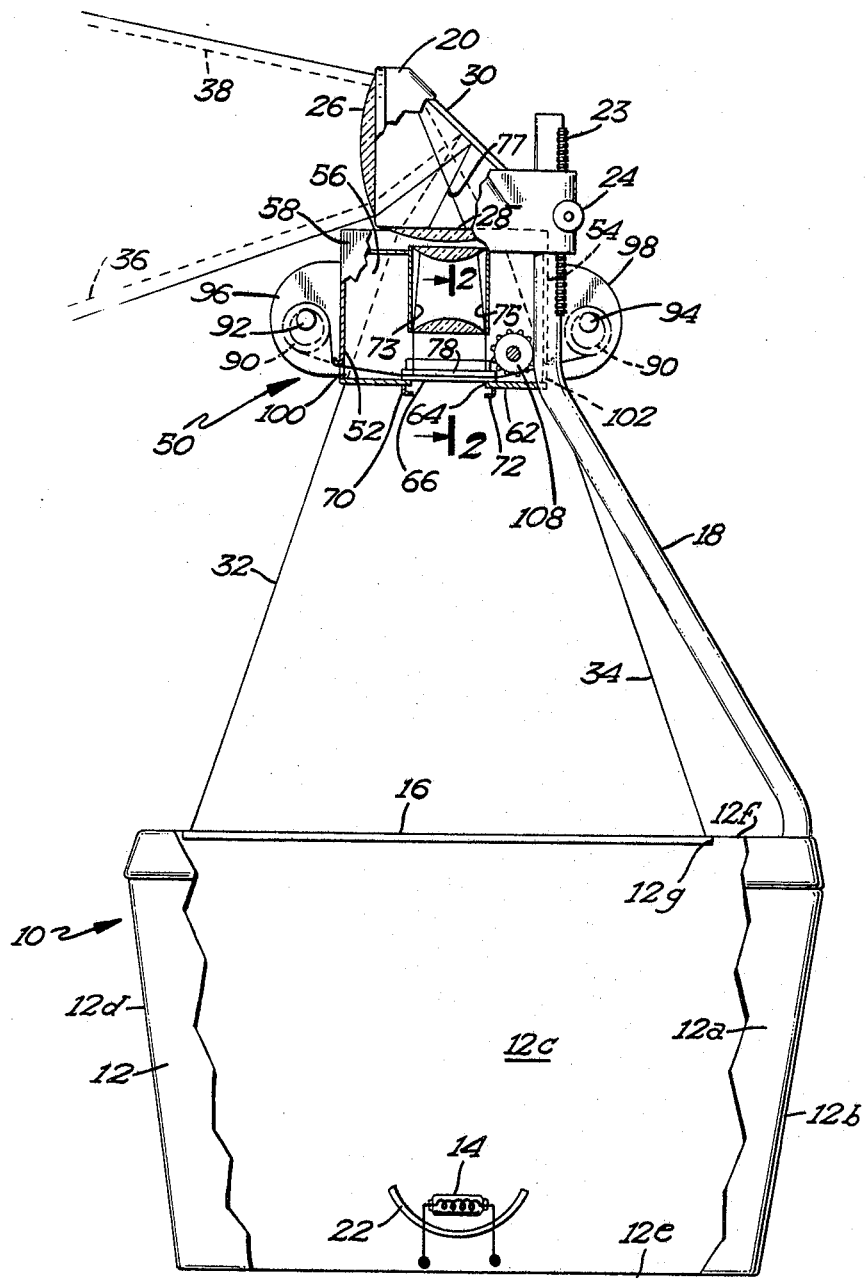
FIGURE 1 is a semi-diagrammatic side elevational view partly broken away of a projector embodying the invention.

Briefly, the present invention provides an overhead projector having a projection lens and a projection lamp. A condensing lens assembly is provided on the projector between the lamp and the projection lens. A supporting means is provided upon the projector for removably mounting an object stage and housing between the lamp and the projection lens in optical alignment with the projection lens and the lamp. The light rays from the lamp are adapted to illuminate an object placed on the stage and the projection lens functions to focus the image of an object on the stage at a remote point. The housing preferably comprises a relatively small enclosure suspended beneath the projection lens and supported thereon. The housing is provided with a pair of spaced condensing lenses positioned in optical alignment with the projection lens.

Refer now to the drawings which illustrate an overhead projector 10 including a base 12, a projection lamp 14, a condensing lens 16 which consists of a Freznel lens and serves as an object supporting platform, a vertically extending bracket 18 and a projection lens casing 20.

The projector base includes four side walls 12a, 12b, 12c and 12d. The bottom wall 12e and top wall 12f having a central opening 12g in which the Freznel lens is mounted.

The lamp 14 is mounted in optical alignment with the Freznel lens 16 and is positioned several inches below it. A parabolic reflector 22 is positioned beneath the lamp 14 for directing the illumination vertically upward through the Freznel lens 16. At the top of the bracket 18 is provided a rack 23. A pinion gear not shown is mounted within the casing 20 in engagement with rack 23. A small knob 24 is connected to the pinion gear for raising and lowering the casing 20 on the upward end of the bracket 18 for the purpose of focusing any image. As can be seen in the figure, the casing 20 includes vertically and horizontally disposed projection lenses 26 and 28. Between the lenses 26 and 28 is a mirror 30 inclined at an angle of about 45° for directing the beam entering lens 28 horizontally through lens 26. It will thus be understood that a beam exemplified by rays 32 and 34 will pass through lens 28, strike mirror 30 and exit through lens 26 as shown by dotted lines designated 36 and 38.

The portion of the apparatus described thus far is entirely conventional. During use, a relatively large transparent object such as an 8½ x 11 inch sheet having visible markings on it is placed on the supporting platform defined by the Freznel lens 16 which serves as a stage. The knob 24 is then turned so as to slide the casing 20 up or down on the upward end of the bracket 18 to thereby properly focus an image on a screen (not shown).

Refer now to FIGURES 1, 2 and 3 which illustrate a preferred form of projection apparatus in accordance with the invention which in this instance is used as an accessory and can be easily and quickly mounted upon or removed from the overhead projection unit already described. The accessory projection apparatus indicated generally by the numeral 50 consists of a supporting framework or housing composed of parallel front and rear walls 52 and 54 respectively which are connected together by laterally spaced side walls 56 and 58. The housing also includes horizontally disposed vertically spaced apart parallel top and bottom walls 60 and 62 respectively.

The bottom wall 62 has a central rectangular opening 64 (FIGURE 1) for admitting illumination from the lamp 14. The area 66 immediately above the opening 64 defines a stage upon which several different types of visual objects can be placed as will be described more fully hereinbelow.

Immediately below the bottom wall 62 and secured thereto on opposite sides of the opening 64 are two parallel laterally extending guide members 70 and 72 which are spaced apart an appropriate distance to receive a support or carrier such as that designated 74 in FIGURE 4. The carrier 74 is in turn adapted to receive photographic or other visual objects such as 35 mm. slides. The carrier 74 is thus provided with two openings 74a and 74b within which the slides are placed. When in use, one of the openings 74a and 74b will project laterally from the apparatus so that a slide can be removed and a new slide inserted with another slide in the viewing position of the center of the stage 66.

The housing 50 is detachably secured to the projector beneath the casing 20 by the provision of three screws 61, 63 and 65 which when threaded in extensions on side walls 56 and 58 that extend vertically above the top wall 60 act as support means for securing the housing in place. When the housing 50 is to be removed, screws 61, 63 and 65 are loosened so as to disengage their pointed inward ends from the sides of the casing 20. In this manner, the housing 50 can be quickly mounted for operation and easily removed when it is not needed.

I have found that a brightly illuminated sharply focused image of an object placed on the stage 66 can be focused on the projection screen and will be of an appropriate size to almost completely fill the screen by the provision of a supplementary projection lens assembly within the housing 50 immediately above and in optical alignment with stage 66. The supplementary projection lens assembly comprises a pair of aligned vertically spaced plano convex lenses designated 67 and 69 mounted within a tube 71 (FIGURE 5) secured at its upper end to the top wall 60. The lens 69 can be positioned from about 1 to 2 inches above the stage 66. The lenses 67 and 69 should have a combined focal length of from about ½ to 2 inches.

As can be seen in FIGURE 2, within the housing adjacent the wall 58 is provided a stop member 76 to which a hold-down plate 78 is secured by means of a hinge 80. The hold-down plate 78 is formed from a suitable clear transparent material such as glass or plastic and is free to swing about the hinge 80 so as to apply a slight downward pressure against a visual object placed beneath it. In accordance with the invention, an opening 82 is provided in the side wall 56 through which the free end of the plate 78 projects. The opening 82 is of sufficient width to accommodate a visual object such as a microfilm transparency. In this instance a microphotographic transparency 84 is mounted within a generally rectangular paperboard business machine card 86. Such cards are often referred to as aperture cards. When a transparent visual object contained in such an aperture card is to be projected on the screen, the card 86 is placed beneath the hold-down plate 78 and inserted through opening 82 until the microphotographic transparency 84 is in alignment with the optic axis of the apparatus.

It can be seen by reference to FIGURE 1 that during operation, rays 73 and 75 passing upwardly from stage 66 through the lens assembly composed of lenses 67 and 69 will be focused at a point 77 which is located a greater distance away from lens 26 than when the housing 50 is not in use. The lens assembly will provide an enlarged virtual image of objects on the stage 66 at the approximate location of the Freznel lens 16. Accordingly, the object on the stage 66 will be in proper focus and will almost completely fill the viewing screen. The tube 71 is preferably but not necessarily slidably and telescopically mounted for vertical adjustment within the top wall 60 for the purpose of making focusing adjustments.

The method employed for projecting film strips will now be described in connection with FIGURES 1, 2 and 3. As shown in FIGURE 1, a film strip 90 is supported upon front and rear parallel horizontally disposed posts 92 and 94 respectively. The posts are themselves attached to front and rear brackets 96 and 98 formed from extensions of the wall 58. The front and rear walls 52 and 54 are provided with openings 100 and 102 to accommodate the film strip 90. When the film strip 90 is being projected, it passes into the apparatus through the opening 100, thence beneath the hold-down plate 78 and is engaged upon the lower aspect of sprockets 106 and 108 which are secured to a shaft 110 mounted for rotation between walls 56 and 58. The shaft 110 is provided with a positioning knob 112 at one end for the purpose of allowing film strip 90 to be advanced and positioned within the apparatus.

It can thus be seen that the supplementary projection apparatus 50 although extremely simple in construction makes possible the projection of a variety of visual objects such as film strips, aperture cards, 35 mm. and 120 mm. slides and the like. Moreover, the image projected almost entirely fills the screen. It is of good quality and is in proper focus. The image in addition is erect on the screen and is right reading (not a mirror image). The invention has further advantages. Among these advantages is the possibility of projecting the image of any of the above visual media from a relatively short distance from the viewing screen, e.g. as little as from 6 to 12 feet. This makes possible projection from the front rather than from the rear of the room which is the general practice in the case of slides and film strips, etc. This advantage of the invention is particularly important in classroom teaching since the teacher can operate the equipment from a location close to the viewing screen and thus keeping the students' attention directed toward the projection area.

When film strips 90 are being used, it is usually desirable to mask out a portion of the stage 66 owing to the small size of the film strip. To accomplish this, a mask 107 is provided as shown in FIGURE 4. The mask can be composed of sheet metal generally rectangular in shape and adapted to fit within the opening 82. The mask is provided with a central aperture 109 corresponding in size to the size of the film strip. The mask 107 can be inserted and removed from opening 82 by the provision of a tab 111 which serves as a handle.

Refer now to FIGURE 5 which shows a further modified form of the invention used in projecting motion pictures from the film rolls of various sizes such as 8 or 16 mm. motion picture film. An important disadvantage in projecting motion picture films in a classroom is the necessity to project them from the rear of the room. Not only is the teacher standing at the rear of the room unable to see the students' faces but the students' attention is drawn first toward the front of the room where the picture is projected and later toward the rear of the room when the instructor speaks. The form of the invention which will now be described enables the instructor to project motion picture film onto a screen from a position located at the front of the classroom from as little as 6 to 8 feet from the screen.

As shown in FIGURE 5, a fixture indicated generally at 150 includes an inclined wall 152, side walls 154, only one of which is shown, and a forwardly facing horizontally disposed tube member 156 within which is telescopically mounted a tube 158 supporting a lens 160. The lens 160 can for example comprise a biconvex lens having focal length of about 4 inches.

As can be seen in the figure, a pair of parallel laterally spaced horizontally disposed rails 166 and 168 are provided. When the fixture 150 is to be used, the rails 166 and 168 are inserted in guides 70 and 72 so that the center of an inclined mirror 167 affixed to the inner wall 152 is in alignment with the center of the stage 66. The rays from the projector 164 exemplified by rays 170 and 172 are thus condensed by lens 160 reflected vertically by mirror 167. The beam then passes through the projection apparatus 50 as described hereinabove in connection with FIGURES 1–3 and the image of the motion picture film is projected on a viewing screen. I have found that surprisingly good results can be provided by placing the projection lens 162 of a motion picture projector 164 from about 4–8 inches away from the fixture 150. The image of the film will moreover be focused sharply upon the screen and will fill substantially the entire screen although the projector itself is positioned only from as little as 6–8 feet from the screen. The image of the film will be erect and unreversed.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A projection apparatus for an overhead projector having a projection lens casing, a projection lens mounted in said casing, a lamp and an object supporting platform, said apparatus comprising a housing, support means on said housing removably mounting the housing on said projection lens casing between the projection lens and the supporting platform whereby the overhead projector can be operated either by itself or with the projection apparatus in position, an object stage on the housing of the projection apparatus in optical alignment with the projection lens and lamp, a supplementary lens assembly means mounted in the housing providing an enlarged virtual image of an object upon the stage, said virtual image being located approximately at the location of the supporting platform whereby the light from the lamp is adapted to illuminate the stage and objects thereon, said projection lens and said supplementary lens assembly means focusing an enlarged image of an object placed upon the stage of the projection apparatus housing at a remote point.

2. The apparatus of claim 1 wherein the supplementary projection lens assembly means includes a plurality of lens elements provided upon the projection apparatus in optical alignment with the stage on the opposite side thereof from the lamp and adjacent to said projection lens.

3. The apparatus of claim 2 wherein the projection lens assembly means comprises a pair of spaced apart lenses having the combined focal length of about ½ to 2 inches.

4. The apparatus of claim 1 wherein the stage is defined by an opening at the lower end of the housing for admitting light from the lamp into the housing and means are provided upon the housing through which visual objects can be inserted into the housing and located on said stage.

5. The apparatus according to claim 4 wherein a vertically movable transparent hold-down plate is positioned immediately above the stage for retaining said visual objects in a fixed position upon the stage.

6. The apparatus of claim 2 wherein a pair of longitudinally spaced apart supporting members are provided for receiving a film strip, openings are provided in the housing for passing the film strip through the housing and across said stage area and means are provided on the housing for positioning and advancing the film strip relative to the stage.

7. The apparatus according to claim 6 wherein the means for advancing the film strip comprises a sprocket mounted upon a shaft for rotation on the housing and adapted to engage the film strip and a knob is connected to the shaft for turning the sprocket.

8. The apparatus according to claim 1 wherein said housing has a stage at the lower portion thereof, openings in the side walls of the housing adjacent the stage for inserting visual objects into the housing whereby the visual objects can be positioned in the center of the stage, said supplementary projection lens assembly means being positioned above the stage, said lens assembly means comprising at least a pair of vertically spaced lenses having a combined focal length of about ½ to 2 inches, supports on said housing for mounting the film strip upon the housing and movable means on the housing mounted above the stage for holding and retaining visual objects on the stage and said support means comprising releasable fasteners provided upon the housing for releasably engaging the projection apparatus upon the projection lens casing.

9. The apparatus according to claim 2 wherein an inclined mirror is provided below the stage and a lens is positioned laterally of the mirror and in optical alignment therewith whereby light rays projected from a motion picture projector can be transmitted through the lens and directed through said lens assembly means and projector lens by the mirror.

10. The apparatus according to claim 1 including a first reflective means positioned below said stage for directing the beam of light produced by a second projector through said stage and into said lens assembly means and projection lens whereby the overhead projector can be converted for projecting the image of a second projector onto a screen.

References Cited

UNITED STATES PATENTS 3,124,035 3/1964 Lucas.
3,285,126 11/1966 Lucas.

NORTON ANSHER, Primary Examiner

R. M. SHEER, Assistant Examiner

U.S. Cl. X.R.

353—68